(12) United States Patent
Turnquist et al.

(10) Patent No.: US 12,258,904 B2
(45) Date of Patent: Mar. 25, 2025

(54) PASSIVE AUXILIARY LUBRICATION SYSTEM

(71) Applicant: General Electric Company, Schenectady, NY (US)

(72) Inventors: Norman A. Turnquist, Sloansville, NY (US); Bugra H. Ertas, Niskayuna, NY (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 17/661,416

(22) Filed: Apr. 29, 2022

(65) Prior Publication Data
US 2023/0349326 A1    Nov. 2, 2023

(51) Int. Cl.
| | |
|---|---|
| *F02C 7/06* | (2006.01) |
| *F01D 25/20* | (2006.01) |
| *F02C 6/08* | (2006.01) |
| *F02C 7/36* | (2006.01) |
| *F16H 57/04* | (2010.01) |

(52) U.S. Cl.
CPC ............... *F02C 7/06* (2013.01); *F01D 25/20* (2013.01); *F02C 6/08* (2013.01); *F02C 7/36* (2013.01); *F16H 57/0442* (2013.01); *F05D 2260/40311* (2013.01); *F05D 2260/60* (2013.01); *F05D 2260/84* (2013.01); *F05D 2260/98* (2013.01)

(58) Field of Classification Search
CPC ...... F02C 7/06; F02C 7/36; F02C 6/08; F05D 2260/98; F05D 2260/40311; F05D 2260/60; F05D 2260/84; F16H 57/0442; F01D 25/18; F01D 25/183; F01D 25/20
See application file for complete search history.

(56) References Cited

U.S. PATENT DOCUMENTS

| | | | | |
|---|---|---|---|---|
| 4,377,374 A | * | 3/1983 | Taylor ................ | F01M 5/00 |
| | | | | 123/195 S |
| 4,717,000 A | * | 1/1988 | Waddington ........ | F16C 33/6662 |
| | | | | 384/473 |

(Continued)

FOREIGN PATENT DOCUMENTS

| | | |
|---|---|---|
| EP | 3091255 A1 | 11/2016 |
| EP | 3241746 A1 | 11/2017 |

(Continued)

*Primary Examiner* — Woody A Lee, Jr.
*Assistant Examiner* — Jesse M Prager
(74) *Attorney, Agent, or Firm* — Venable LLP; Griffin A. A. Deadwick; Michele V. Frank

(57) ABSTRACT

A passive auxiliary lubrication system for supplying lubricant to a gearbox assembly of an engine. The passive auxiliary lubrication system includes an auxiliary tank for storing lubricant. The auxiliary tank is passively pressurized. The passive auxiliary lubrication system also includes an auxiliary tank feed line fluidly coupled with the auxiliary tank and a primary lubrication system. The lubricant is supplied to the auxiliary tank from the primary lubrication system through the auxiliary tank feed line and the lubricant is passively pressurized in the auxiliary tank. The passive auxiliary lubrication system further includes an auxiliary supply line fluidly coupled with the auxiliary tank and the gearbox assembly. The lubricant in the auxiliary tank is supplied to the gearbox assembly through the auxiliary supply line.

13 Claims, 6 Drawing Sheets

(56) References Cited

U.S. PATENT DOCUMENTS

| | | | |
|---|---|---|---|
| 7,905,325 B1* | 3/2011 | Wedlake | F02C 7/06 |
| | | | 184/55.1 |
| 8,777,792 B2* | 7/2014 | Imai | F16H 57/045 |
| | | | 475/159 |
| 9,151,327 B2* | 10/2015 | Jenkins | F16C 17/24 |
| 10,746,284 B2 | 8/2020 | Gmirya et al. | |
| 10,816,085 B2 | 10/2020 | Olson et al. | |
| 11,125,111 B2 | 9/2021 | Mason et al. | |
| 11,215,078 B2 | 1/2022 | Menczykalski et al. | |
| 2001/0047647 A1 | 12/2001 | Cornet | |
| 2008/0116009 A1* | 5/2008 | Sheridan | F16N 17/06 |
| | | | 184/6.12 |
| 2010/0086403 A1 | 4/2010 | McCune | |
| 2013/0051984 A1* | 2/2013 | McCune | F02C 7/36 |
| | | | 415/122.1 |
| 2014/0124297 A1* | 5/2014 | Motto | F01D 25/20 |
| | | | 184/6.12 |
| 2017/0108113 A1* | 4/2017 | Hasting | F02K 3/06 |
| 2019/0203648 A1* | 7/2019 | Sheridan | F01D 25/18 |
| 2019/0316672 A1 | 10/2019 | Davies | |
| 2020/0284195 A1* | 9/2020 | Gebhard | F02C 7/36 |
| 2021/0324798 A1* | 10/2021 | Fujii | F16N 7/32 |
| 2022/0010842 A1* | 1/2022 | Harvey | F01D 25/18 |

FOREIGN PATENT DOCUMENTS

| | | |
|---|---|---|
| EP | 3293363 A2 | 3/2018 |
| EP | 3828402 A1 | 6/2021 |
| FR | 3127024 A1 | 3/2023 |
| FR | 3127025 A1 | 3/2023 |
| FR | 3129436 A1 | 5/2023 |
| FR | 3129690 A1 | 6/2023 |
| FR | 3130747 A1 | 6/2023 |
| FR | 3130875 A1 | 6/2023 |

* cited by examiner

PASSIVE AUXILIARY LUBRICATION SYSTEM

TECHNICAL FIELD

The present disclosure relates to lubrication systems for gearbox assemblies of gas turbine engines, and, more particularly, to a passive auxiliary lubrication system for a gearbox assembly of a gas turbine engine.

BACKGROUND

A gas turbine engine generally includes a fan and a core section arranged in flow communication with one another. Additionally, the core section includes, in serial flow order, a compressor section, a combustion section, a turbine section, and an exhaust section. A gearbox assembly may transfer torque and power from the core section (e.g., the compressor section and/or the turbine section) to the fan. The gas turbine engine may also include a lubrication system for providing lubricant to one or more components of the gearbox assembly.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Figure 1:
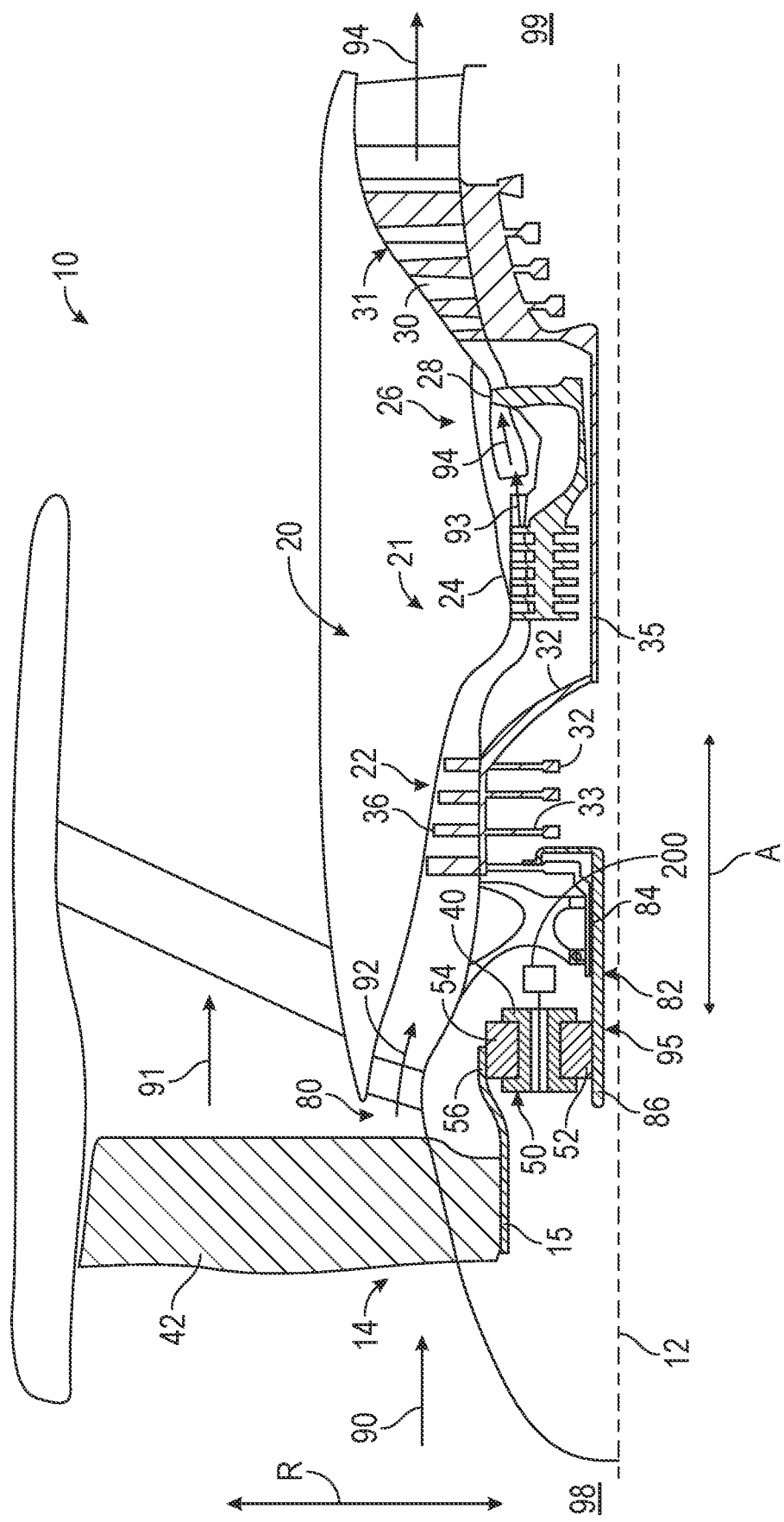
FIG. 1 illustrates a schematic cross-sectional view of one embodiment of a gas turbine engine having a lubrication system, according to an aspect of the present disclosure.

Features, advantages, and embodiments of the present disclosure are set forth or apparent from a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components and/or the systems or manufacturing the components and/or the systems. For example, the approximating language may refer to being within a one, a two, a four, a ten, a fifteen, or a twenty percent margin in either individual values, range(s) of values and/or endpoints defining range(s) of values.

As used herein, "passively pressurize" is pressurizing a component with potential energy (e.g., mechanical energy or air pressure), and without the use of dedicated control systems or pumps.

As used herein, "passive auxiliary lubrication" includes supplying lubrication using potential energy (e.g., a pressure differential within the system) and without the use of dedicated control systems or pumps.

The present disclosure provides for a passive auxiliary lubrication system for providing lubricant (e.g., oil) to a gearbox assembly of an engine, such as a gas turbine engine. The engine includes a primary lubrication system and the passive auxiliary lubrication system for providing the lubricant to the gearbox assembly. The primary lubrication system includes a pump that pumps lubricant from a primary tank to the gearbox assembly for lubricating components of the gearbox assembly (e.g., gears, gear meshes, journal bearings, or the like). The pump pressurizes the lubricant from the primary tank such that pressurized lubricant is provided to the gearbox assembly. In some instances, the pressure of the lubricant in the primary lubrication system may decrease such that the primary lubrication system is unable to provide the lubricant to the gearbox assembly. For example, an abnormal event may cause the pump to be non-operational. In such instances, the passive auxiliary lubrication system passively provides lubricant to the gearbox assembly. The passive auxiliary lubrication system includes an auxiliary tank, a tank recharge line, and an auxiliary lubricant discharge line. In some examples, the auxiliary tank includes a spring-loaded piston to passively pressurize the lubricant in the auxiliary tank. In some examples, the auxiliary tank receives bleed air from a compressor of the engine to passively pressurize the lubricant. In some examples, the auxiliary tank also includes a mechanical stop to stop the piston such that the piston may not move beyond the mechanical stop.

In operation, the lubricant is directed from the primary lubrication system to fill the auxiliary tank. For example, the lubricant is pumped from the primary tank and flows into the auxiliary tank. A check valve in the recharge line opens to allow the lubricant to flow into the auxiliary tank until the auxiliary tank reaches a predetermined pressure. The auxiliary tank is passively pressurized (e.g., mechanically energized) via the internal spring-loaded piston. In some examples, the auxiliary tank is passively pressurized by the bleed air from the compressor. When the primary lubrication system loses pressure, the passively pressurized lubricant is supplied to the gearbox assembly. For example, the piston pushes the lubricant out of the auxiliary tank and into the auxiliary lubricant discharge line. When the pressure in the primary lubrication system decreases below a predetermined threshold, a check valve in the auxiliary lubricant discharge line opens to allow the lubricant to flow from the auxiliary tank to the gearbox assembly. In this way, the lubricant in the auxiliary tank bypasses the pump of the primary lubrication system. Thus, the passive auxiliary lubrication system supplies lubricant to the gearbox assembly without the use of a pump. For example, the spring-loaded piston pushes the lubricant out of the auxiliary tank and to the gearbox assembly. In some examples, the check valve in the auxiliary lubricant discharge line may include an actuated valve controlled by a controller.

The lubricant from the auxiliary tank is supplied directly to the planet gear support pins of the gearbox assembly. The lubricant is then routed to the other components, such as the journal bearings and the gear meshes. For example, the lubricant may be routed to the journal bearings and the gear interfaces via ports running axially through the pins and radially to the journal bearings and the gear interfaces. When the planet carrier is a rotating planet carrier (e.g., the ring gear rotates), this aspect provides a way to transfer the lubricant across either axial gaps or radial gaps between the stationary component (e.g., the auxiliary lubricant discharge line) and the rotating component (e.g., the rotating planet carrier).

Referring now to the drawings, FIG. 1 illustrates a schematic cross-sectional view of a gas turbine engine, also referred to as engine 10. As shown in FIG. 1, the engine 10 is depicted as a high bypass turbofan engine, incorporating an exemplary embodiment of a shaft assembly 95 according to an aspect of the present disclosure. Although further described below with reference to a turbofan engine, the present disclosure is also applicable to wind turbines and turbomachinery in general, including turbofan, propfan, turbojet, and turboshaft gas turbine engines, including marine and industrial turbine engines and auxiliary power units. As shown in FIG. 1, the engine 10 has an axial centerline axis, also referred to as axis 12, that extends therethrough for reference purposes. The engine 10 defines an axial direction A and a radial direction R. The engine 10 includes a forward end 98 and an aft end 99 along the axial direction A.

In general, the engine 10 includes an engine core 20 and a fan 14. The engine core 20 generally includes, in serial flow arrangement, a compressor section 21, a combustion section 26, and a turbine section 31. The compressor section 21 defines one or more compressors, such as a high-pressure compressor (HPC) 24 and a low-pressure compressor (LPC) 22. The turbine section 31 defines one or more turbines, such as a high-pressure turbine (HPT) 28 and a low-pressure turbine (LPT) 30. In various embodiments, the compressor section 21 may further include an intermediate pressure compressor (IPC). In still other embodiments, the turbine section 31 may further include an intermediate pressure turbine (IPT). In wind turbine applications, the engine core 20 may generally be defined as one or more generators.

The LPC 22, the HPC 24, the HPT 28, and the LPT 30 each includes one or more rotors 32. In one embodiment, the one or more rotors 32 includes one or more shafts 35 of the engine 10 connecting the compressor section 21 to the turbine section 31. In other embodiments, the one or more rotors 32 generally defines a disk 33 extended in the radial direction R and a plurality of airfoils 36 connected in a circumferentially adjacent arrangement and extending outward in the radial direction R from the disk 33. In various embodiments, one or more compressors of the compressor section 21 are coupled to and are rotatable with one or more turbines of the turbine section 31 by way of the one or more shafts 35.

The fan 14 generally includes a fan rotor 15. The fan rotor 15 includes a plurality of fan blades 42 that are coupled to and extend outwardly from the fan rotor 15 in the radial direction R. In the embodiments shown in FIG. 1, the fan rotor 15 extends in the axial direction A toward the forward end 98 from a gearbox assembly 40. The gearbox assembly 40 may include a reduction gearbox. The fan 14 further includes the shaft assembly 95 coupled to the gearbox assembly 40, extended toward the aft end 99 and coupled to the engine core 20.

In one embodiment, the gearbox assembly 40 includes a gear train assembly 50 having any suitable configuration, such as a planetary configuration or a star configuration. For example, as shown in the illustrated embodiment, the gear train assembly 50 includes a sun gear 52 and a plurality of planet gears 54. In some examples the plurality of planet gears 54 are each fixed such that each planet gear 54 rotates on a fixed axis relative to the sun gear 52. A ring gear 56 surrounds the plurality of planet gears 54 and rotates and transfers power and torque from the sun gear 52 through the plurality of planet gears 54. In some examples, the ring gear 56 is coupled to the fan rotor 15. In some examples, the ring gear 56 is fixed and a planet carrier (not shown in FIG. 1) is coupled to the fan rotor 15 such that the planet carrier rotates and transfers power and torque from the sun gear 52 through the plurality of planet gears 54, as detailed further below. In one embodiment, the sun gear 52 is attached to, or integral with, the shaft assembly 95. In various embodiments, the gearbox assembly 40 may further include additional planet gears disposed radially between the plurality of planet gears 54 and the sun gear 52, or between the plurality of planet gears 54 and the ring gear 56. A lubrication system 200 provides lubrication to various components of the gearbox assembly 40, as detailed further below.

The shaft assembly 95 is coupled to the engine core 20 to transmit torque and power through the sun gear 52 to the gearbox assembly 40 and to the fan rotor 15. The fan rotor 15 is connected to the surrounding ring gear 56 to receive torque from the sun gear 52 and to transfer torque to drive the fan 14. Alternatively, the fan rotor 15 is connected to the planet gears 54 (e.g., via the planet carrier) to receive torque from the sun gear 52 and to transfer torque to drive the fan 14. As power and torque are transmitted from the engine core 20, the gearbox assembly 40 provides power and torque at an output speed to the fan rotor 15 more suitably adjusted for the fan 14. For example, the gearbox assembly 40 may reduce the speed of the fan rotor 15 relative to the engine core 20 by a factor greater than one.

During operation of the engine 10, as shown in FIG. 1, a volume of air (as indicated by arrow 90) enters the engine 10. As the air passes across the fan blades 42, a portion of the air (as indicated by arrow 91) is directed outside of the engine core 20 to provide propulsion. Additionally, another portion of air (as indicated by arrow 92) is directed through an associated inlet 80 into the compressor section 21. The air (as indicated by arrow 92) is progressively compressed as it flows through the compressor section 21, such as through the LPC 22 and through the HPC 24, toward the combustion section 26.

The now compressed air (as indicated by arrow 93) flows into the combustion section 26 where a fuel is introduced. The fuel is mixed with at least a portion of the compressed air, and the fuel-air mixture is ignited to form combustion gases (as indicated by the arrow 94). The combustion gases flow into the turbine section 31, causing rotary members of the turbine section 31 to rotate and to support operation of respectively coupled rotary members in the compressor section 21 and/or may rotate the fan 14. For example, the HPC 24 and the HPT 28 is rotatable to drive the engine 10 and to generate the combustion gases at the combustion section 26 to drive the LPT 30. In some examples, the LPT 30 is connected to the LPC 22. Referring to FIG. 1, a coupling shaft 82 is coupled to the LPC 22 at a first end 84 and to the gearbox assembly 40 at a second end 86. In other embodiments, the coupling shaft 82 is coupled to the HPC 24 at the first end 84. In other embodiments, the coupling shaft 82 is coupled to the turbine section 31 at the first end 84 and to the gearbox assembly 40 at the second end 86. In other embodiments, the coupling shaft 82 is coupled to the HPT 28 at the first end 84. The gearbox assembly 40 may reduce the rotational speed from the engine core 20 (e.g., the compressor section 21 or the turbine section 31) and provide a desired amount of torque and a desired amount of rotational speed to the fan 14.

Figure 2:
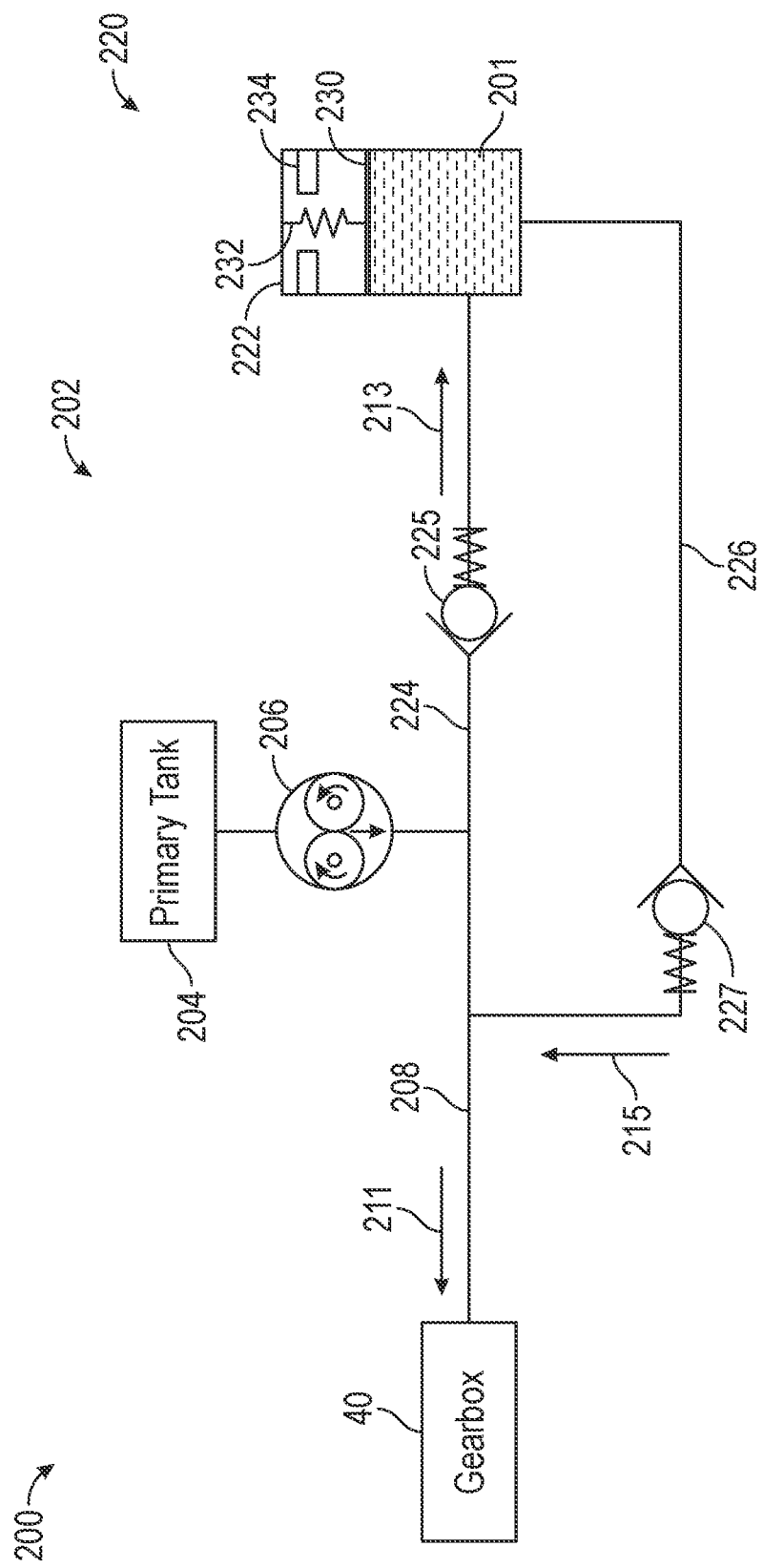
FIG. 2 is a schematic view of the lubrication system of FIG. 1, according to an aspect of the present disclosure.

FIG. 2 is a schematic side view of an exemplary lubrication system 200 of FIG. 1, according to aspects of the present disclosure. The lubrication system 200 includes a primary lubrication system 202 and a passive auxiliary lubrication system 220. The primary lubrication system 202 includes a primary tank 204, a pump 206, and a primary supply line 208. The primary tank 204 stores a fluid, such as a lubricant (e.g., oil). The pump 206 pressurizes the lubricant and pumps the pressurized lubricant from the primary tank 204. The pressurized lubricant is supplied through the primary supply line 208 to the gearbox assembly 40 (as indicated by the arrow 211) to lubricate various components of the gearbox assembly 40, as detailed further below.

The passive auxiliary lubrication system 220 includes an auxiliary tank 222, an auxiliary tank feed line 224, an auxiliary supply line 226, a first valve 225, and a second valve 227. The auxiliary tank 222 includes a passively pressurized reservoir for storing lubricant. For example, the auxiliary tank 222 may include a piston 230. The piston 230 is attached to a spring 232 such that the piston 230 is spring-loaded. In this way, the piston 230 reciprocates (e.g., up and down) within the auxiliary tank 222 to pressurize the lubricant in the auxiliary tank 222 and to provide the lubricant in the auxiliary tank 222 to the gearbox assembly 40, as detailed further below. The piston 230 may include ways other than a spring for enabling reciprocation of the piston 230.

In some examples, the auxiliary tank 222 also includes a mechanical stop 234. The mechanical stop 234 in the auxiliary tank 222 prevents the piston 230 from moving beyond the mechanical stop 234. In this way, the mechanical stop 234 prevents the spring 232 from being over compressed. The mechanical stop 234 may be placed anywhere within the auxiliary tank 222, as desired, for controlling an amount of spring compression of the spring 232.

The auxiliary tank feed line 224 is fluidly coupled with the primary tank 204 of the primary lubrication system 202 and is fluidly coupled with the auxiliary tank 222. The auxiliary supply line 226 is fluidly coupled with the auxiliary tank 222 and the gearbox assembly 40, as detailed further below.

The first valve 225 is disposed in the auxiliary tank feed line 224. In some examples, the first valve 225 includes a check valve. For example, the first valve 225 includes a one-way check valve that allows fluid (e.g., lubricant) to flow through the first valve 225 in only one direction. The first valve 225 includes a cracking pressure that is a minimum differential upstream pressure between an inlet of the first valve 225 and an outlet of the first valve 225 at which the first valve 225 will operate. For example, the first valve 225 allows lubricant to flow from the primary supply line 208 through the auxiliary tank feed line 224 towards the auxiliary tank 222 if a pressure of the lubricant at an upstream side of the first valve 225 is greater than a pressure of the lubricant at a downstream side of the first valve 225. In this way, the first valve 225 is considered to be a passive valve. The first valve 225 may also include an actuated valve mechanically controlled by a controller (not shown), or may include a valve controlled by pressure feedback in the auxiliary tank feed line 224.

The second valve 227 is disposed in the auxiliary supply line 226. In some examples, the second valve 227 includes a check valve. For example, the second valve 227 includes a one-way check valve that allows fluid (e.g., lubricant) to flow through the second valve 227 in only one direction. The second valve 227 includes a cracking pressure that is a minimum differential upstream pressure between an inlet of the second valve 227 and an outlet of the second valve 227 at which the second valve 227 will operate. For example, the second valve 227 allows lubricant to flow from the auxiliary tank 222 through the auxiliary supply line 226 towards the gearbox assembly 40 if a pressure of the lubricant at an upstream side of the second valve 227 is greater than a pressure at a downstream side of the second valve 227. In this way, the second valve 227 is considered to be a passive valve. The second valve 227 may also include an actuated valve mechanically controlled by a controller (now shown), or may include a valve controlled by pressure feedback in the auxiliary supply line 226. For example, the controller receives signals from one or more pressure sensors and determines when the pressure in the primary lubrication system 202 is less than the pressure in the auxiliary tank 222. In such instances, the controller opens the second valve 227.

In operation, the auxiliary tank 222 is empty (or substantially empty) prior to startup of the engine 10. In such instances, the piston 230 is at or adjacent an internal bottom side of the auxiliary tank 222. When the engine 10 is started, the pump 206 begins to pump the lubricant from the primary tank 204 and pressurizes the lubricant. The pressurized lubricant flows through the auxiliary tank feed line 224 towards the auxiliary tank 222 (as indicated by arrow 213). Since the auxiliary tank 222 is empty (or substantially empty), the pressurized lubricant passes through the first valve 225 (e.g., the pressurized lubricant includes a greater pressure than a pressure in the auxiliary tank 222). The pressurized lubricant then fills the auxiliary tank 222. In this way, the lubricant is supplied to the auxiliary tank 222 from the primary lubrication system 202. As the pressurized lubricant flows into the auxiliary tank 222, the pressurized lubricant causes the piston 230 to be reciprocated. In other words, the pressurized lubricant filling the auxiliary tank 222 causes the piston 230 to move in an upward direction. In this way, the spring 232 compresses and stores potential energy. When the spring 232 has fully compressed and/or when the piston 230 has been moved to the mechanical stop 234, the auxiliary tank 222 is full with pressurized lubricant. In such a state, the auxiliary tank 222 is considered to be charged. Thus, the auxiliary tank 222 is mechanically preloaded or mechanically pressurized (e.g., pressurized without the use of a pump). The lubricant stored in the auxiliary tank 222 is also referred to as an auxiliary lubricant 201.

When the auxiliary tank 222 is charged (e.g., the auxiliary tank 222 is full), the first valve 225 prevents additional pressurized lubricant from flowing to the auxiliary tank 222. For example, the pressure in the auxiliary tank 222 is greater than or equal to the pressure of the pressurized lubricant upstream of the first valve 225. The pump 206 then continuously pumps lubricant from the primary tank 204 and supplies the pressurized lubricant through the primary supply line 208, and towards the gearbox assembly 40 to lubricate various components of the gearbox assembly 40, as detailed further below.

In some instances, the primary lubrication system 202 may cease from operation or otherwise may not be available. For example, an abnormal operating event may cause the primary lubrication system 202 to lose pressure (e.g., due to a failure of the pump 206, a shutdown of engine 10, or another cause). In such instances, the primary lubrication system 202 is unable to provide pressurized lubricant to the gearbox assembly 40 or the primary lubrication system 202 is unable to provide adequate pressure of the lubricant for providing the lubricant to the gearbox assembly 40 (e.g., to the components of the gearbox assembly 40). Thus, the passive auxiliary lubrication system 220 supplies the auxiliary lubricant 201 from the auxiliary tank 222 to the gearbox assembly 40. For example, during such abnormal operating event, a pressure in the primary supply line 208 decreases (e.g., due to the pump 206 stopping) below a predetermined pressure threshold. The second valve 227 then opens. For example, the pressure in the auxiliary tank 222 is greater than the pressure in the primary supply line 208 of the primary lubrication system 202. Thus, the auxiliary lubricant 201 is discharged from the auxiliary tank 222 and flows through the auxiliary supply line 226, through the primary supply line 208, and towards the gearbox assembly 40 (as indicated by arrow 215) for lubricating various components of the gearbox assembly 40, as detailed further below. In this way, the auxiliary lubricant 201 is supplied from the auxiliary tank 222 to the gearbox assembly 40. The spring 232 extends or otherwise decompresses and the piston 230 pushes the auxiliary lubricant 201 out of the auxiliary tank 222 through the auxiliary supply line 226. The auxiliary lubricant 201 flows out of the auxiliary tank 222 until the auxiliary tank 222 is empty or is substantially empty. Thus, the auxiliary tank 222 is no longer charged or pre-loaded.

When the abnormal operating event ends and/or when the engine 10 is powered back on, the auxiliary tank 222 is passively pressurized and is recharged, as detailed above. Thus, the passive auxiliary lubrication system 220 provides the auxiliary lubricant 201 to the gearbox assembly 40 without the use of additional components. For example, the passive auxiliary lubrication system 220 supplies the auxiliary lubricant 201 from the auxiliary tank 222 to the gearbox assembly 40 without a pump. In some examples, the passive auxiliary lubrication system 220 includes an isolation valve, or the like, for shutting off the supply of lubricant from the auxiliary tank 222. For example, the isolation valve may shut off the supply of lubricant from the auxiliary tank 222 when the engine 10 is shutdown such that the lubricant does not flow from the auxiliary tank 222 to the gearbox assembly 40 when the engine 10 is not running.

Figure 3:
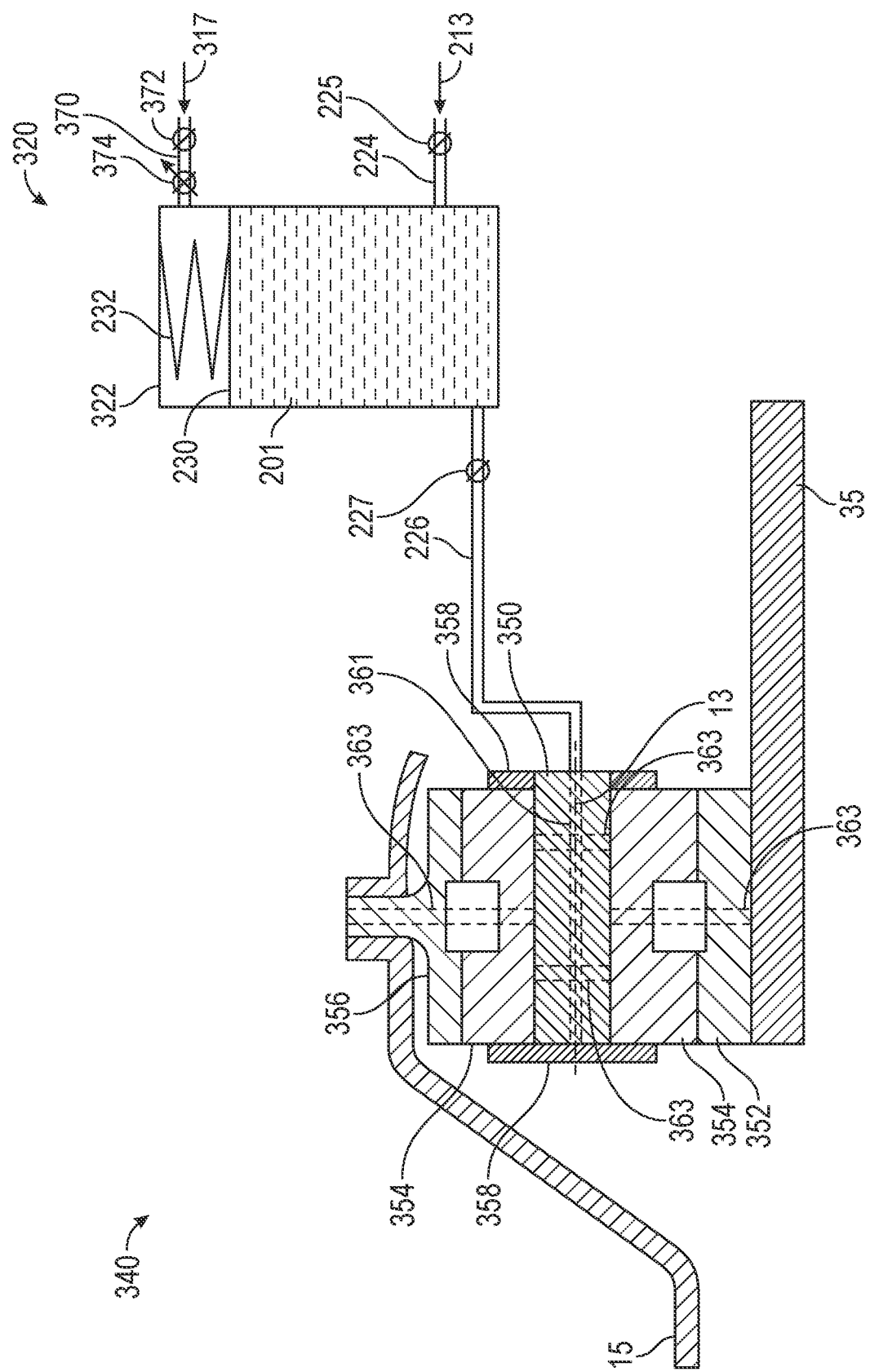
FIG. 3 is a schematic partial cross-sectional side view of an exemplary gearbox assembly and an exemplary passive auxiliary lubrication system, according to an aspect of the present disclosure.

FIG. 3 shows a schematic partial cross-sectional side view of another exemplary gearbox assembly 340 and a passive auxiliary lubrication system 320 (shown schematically in FIG. 3). The gearbox assembly 340 may be employed in the engine 10 of FIG. 1. That is, the gearbox assembly 340 couples the one or more shafts 35 to the fan 14 (FIG. 1). The passive auxiliary lubrication system 320 of FIG. 3 includes many of the same or similar components and functionality as the embodiment shown in FIG. 2. The same reference numeral is used for the same or similar components in these two embodiments, and a detailed description of these components and functionality is omitted here.

The gearbox assembly 340 includes a sun gear 352, a plurality of planet gears 354 (only one of which is visible in FIG. 3), and a ring gear 356. For clarity, only a portion of the gears is shown. The gearbox assembly 340 is a star type or a rotating ring gear type gearbox assembly (e.g., the ring gear 356 is rotating and a planet carrier 358 is fixed and stationary). The planet carrier 358 constrains the plurality of planet gears 354 such that the plurality of planet gears 354 do not together rotate around the sun gear 352 while enabling each planet gear of the plurality of planet gears 354 to rotate about its own axis 13. The ring gear 356 is coupled via the fan rotor 15 to the fan 14 (FIG. 1) and rotates to drive rotation of the fan 14 (FIG. 1) about the axis 12. Radially inward of the ring gear 356, and intermeshing therewith, is the plurality of planet gears 354. Each of the planet gears of the plurality of planet gears 354 includes a pin 350 about which a respective planet gear rotates.

The gearbox assembly 340 includes one or more passages to supply the lubricant from the lubrication system 200 (FIG. 2) to the various gears and components of the gearbox assembly 340. The one or more passages include one or more first passages 361 and one or more second passages 363. The one or more first passages 361 allow the lubricant to flow in an axial direction. For example, the one or more first passages 361 allow the lubricant to flow through the pin 350. The one or more second passages 363 allow the lubricant to flow in a radial direction. For example, the one or more second passages 363 allow the lubricant to flow from the one or more first passages 361 to the various gears (e.g., the sun gear 352, one or more of the plurality of planet gears 354, and/or the ring gear 356).

As shown in FIG. 3, the passive auxiliary lubrication system 320 is in fluid communication with the gearbox assembly 340. For example, the auxiliary supply line 226 is fluidly coupled to the pin 350 for supplying the auxiliary lubricant 201 from the auxiliary tank 222 through the pin 350 to the gears of the gearbox assembly 340 (e.g., through the one or more first passages 361 and the one or more second passages 363), as detailed further below.

In the embodiment of FIG. 3, the passive auxiliary lubrication system 320 includes an auxiliary tank 322. The auxiliary tank 322 is alternatively, or additionally, recharged using compressor bleed air. For example, the auxiliary tank 322 is in fluid communication with a compressor bleed air line 370 that fluidly couples the auxiliary tank 322 with the compressor section 21 (e.g., with the HPC 24 and/or the LPC 22) (FIG. 1). In this way, the auxiliary tank 322 receives the compressor bleed air via the compressor bleed air line 370 (as indicated by arrow 317). The compressor bleed air enters the auxiliary tank 322 and pressurizes the auxiliary tank 322. For example, the compressor bleed air fills a remaining portion of the auxiliary tank 322 that is not otherwise occupied by the auxiliary lubricant 201. Thus, the auxiliary tank 322 is passively pressurized by the compressor bleed air. In some examples, the compressor bleed air line 370 includes a third valve 372 and a pressure regulator 374. The third valve 372 includes a check valve or an actuated valve, similar to that of the first valve 225 and the second valve 227 (FIG. 2). The pressure regulator 374 controls the pressure inside the auxiliary tank 322 in a manner to maintain a desired pressure or a required pressure or until the pressure inside the auxiliary tank 322 reaches a desired pressure or a require pressure. For example, the pressure regulator 374 monitors the pressure inside the auxiliary tank 322 and opens and/or closes the third valve 372 to regulate an amount of the compressor bleed air into the auxiliary tank 322. The third valve 372 remains open to allow a flow of compressor bleed air into the auxiliary tank 322 until a desired pressure is reached. The third valve 372 then closes to prevent additional compressor bleed air from flowing into the auxiliary tank 322. In this way, the auxiliary tank 322 is passively pressurized by the compressor bleed air to charge and/or to recharge the auxiliary tank 322.

In operation, during an abnormal operating event in which the primary lubrication system 202 (FIG. 2) is unavailable or is unable to provide lubrication to the gearbox assembly 340, the passive auxiliary lubrication system 320 supplies the auxiliary lubricant 201 to the gearbox assembly 340, as detailed above. The auxiliary lubricant 201 from the auxiliary tank 322 is fed to one or more of the gears, for example, to the sun gear 352, to one or more of the plurality of planet gears 354, to the ring gear 356, or any combination thereof, via one or more of the one or more first passages 361 and/or via the one or more second passages 363. For example, the auxiliary lubricant 201 flows into the pin 350 through a connection between the auxiliary supply line 226 and the one or more first passages 361. In this way, the auxiliary supply line 226 is fluidly coupled to the one or more first passages 361. The auxiliary lubricant 201 then flows through the one or more second passages 363 to the various gears to lubricate the gears (e.g., the sun gear 352, one or more of the plurality of planet gears 354, and/or the ring gear 356). Thus, the passive auxiliary lubrication system 320 supplies auxiliary lubricant from the auxiliary tank 322 to the gearbox assembly 340 to lubricate the various gears of the gearbox assembly 340 (e.g., journal bearings, gear meshes, etc. of the various gears).

Figure 4:
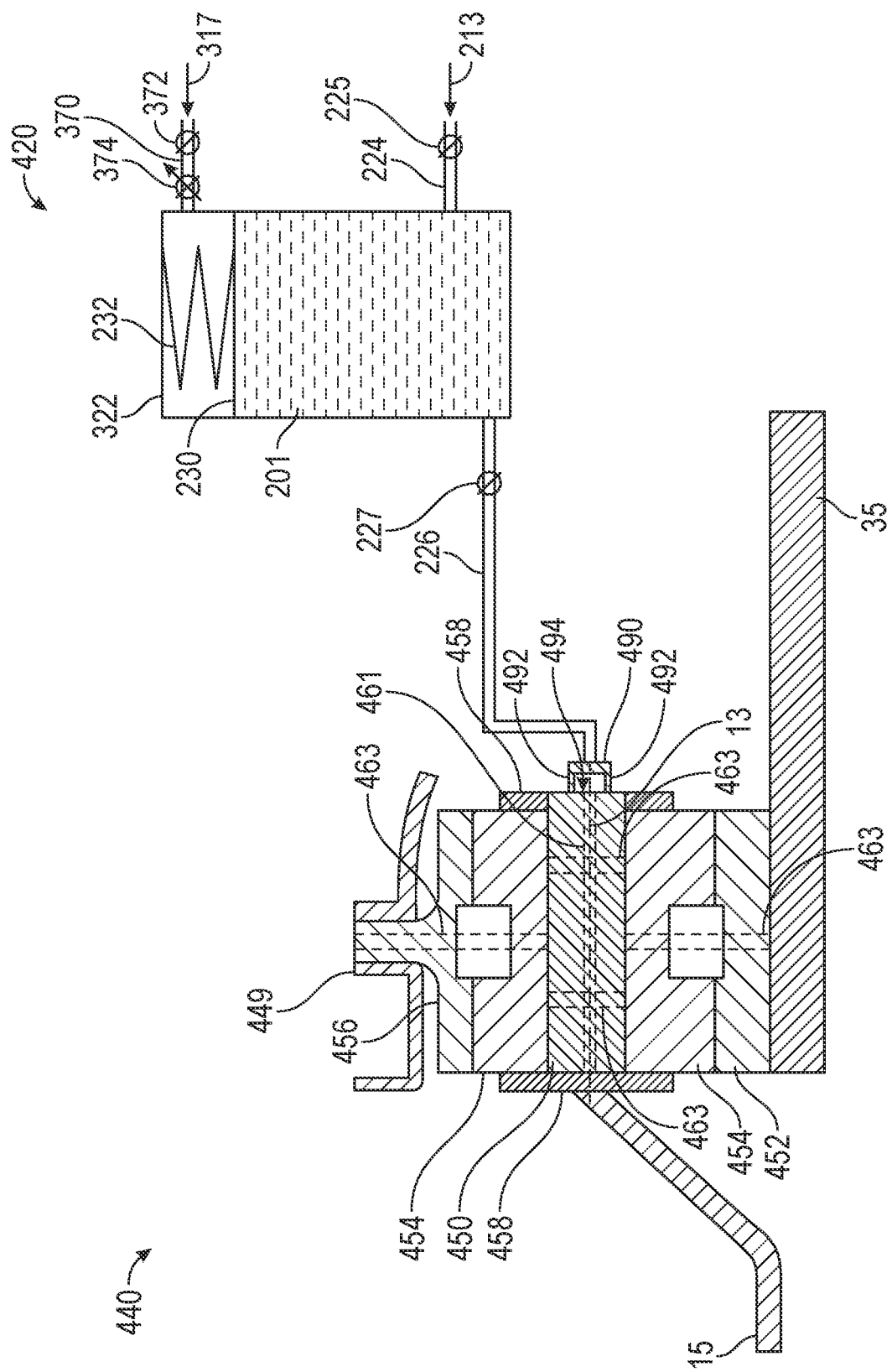
FIG. 4 is a schematic partial cross-sectional side view of another exemplary gearbox assembly and another passive auxiliary lubrication system, according to an aspect of the present disclosure.

FIG. 4 shows a schematic partial cross-sectional side view of another exemplary gearbox assembly 440 and another exemplary passive auxiliary lubrication system 420 (shown schematically in FIG. 4). The gearbox assembly 440 may be employed in the engine 10 of FIG. 1. That is, the gearbox assembly 440 couples the one or more shafts 35 to the fan 14 (FIG. 1). The passive auxiliary lubrication system 420 of FIG. 4 includes many of the same or similar components and functionality as the embodiments shown in FIGS. 2 and 3. The same reference numeral is used for the same or similar components in these embodiments, and a detailed description of these components and functionality is omitted here.

The gearbox assembly 440 includes a sun gear 452, a plurality of planet gears 454 (only one of which is visible in FIG. 4), and a ring gear 456. For clarity, only a portion of the gears is shown. The gearbox assembly 440 is of a fixed ring gear type (e.g., the ring gear 456 is stationary and fixed, while a planet carrier 458 and the plurality of planet gears 454 are rotating). The planet carrier 458 constrains the plurality of planet gears 454 to rotate around the sun gear 452 in synchronicity while enabling each planet gear of the plurality of planet gears 454 to rotate about its own axis 13. The planet carrier 458 is coupled via the fan rotor 15 to the fan 14 (FIG. 1) and rotates with the plurality of planet gears 454 in order to drive rotation of the fan 14 (FIG. 1) about the axis 12. Radially outwardly of the plurality of planet gears 454, and intermeshing therewith, is the ring gear 456, which is connected via linkages 449 to a stationary support structure (not shown). In the example of FIG. 4, the ring gear 456 is stationary and fixed to the linkages 449. Each of the planet gears of the plurality of planet gears 454 includes a pin 450 about which a respective planet gear rotates.

The gearbox assembly 440 includes one or more passages to supply the lubricant from the lubrication system 200 (FIG. 2) to the various gears and components of the gearbox assembly 340. The one or more passages includes one or more first passages 461 and one or more second passages 463. The one or more first passages 461 allow the lubricant to flow in an axial direction. For example, the one or more first passages 461 allow the lubricant to flow through the pin 450. The one or more second passages 463 allow the lubricant to flow in a radial direction. For example, the one or more second passages 463 allow the lubricant to flow from the one or more first passages 461 to the various gears (e.g., the sun gear 452, one or more of the plurality of planet gears 454, and/or the ring gear 456).

As shown in FIG. 4, the passive auxiliary lubrication system 420 includes the same auxiliary tank 322, as detailed above. The passive auxiliary lubrication system 420 is in fluid communication with the gearbox assembly 440. For example, the auxiliary supply line 226 is fluidly coupled to the pin 450 for supplying the auxiliary lubricant 201 from the auxiliary tank 222 through the pin 450 to the gears of the gearbox assembly 440 (e.g., through the one or more first passages 461 and the one or more second passages 463), as detailed further below.

In the embodiment of FIG. 4, the passive auxiliary lubrication system 420 includes a lubricant transfer device 490. The lubricant transfer device 490 facilitates transfer of the auxiliary lubricant 201 from the auxiliary supply line 226 to the pin 450. For example, the auxiliary supply line 226 is stationary and the pin 450 rotates with the planet carrier 458, as detailed above. In this way, the lubricant transfer device 490 facilitates transfer of the auxiliary lubricant 201 from the auxiliary supply line 226 (stationary) to the pin 450 (rotating).

The lubricant transfer device 490 includes one or more seals 492 (e.g., a labyrinth tooth seal) and a cavity 494. The cavity 494 is annular and is fluidly coupled to the auxiliary supply line 226. The one or more seals 492 defines a portion of the cavity 494 and engages with a portion of the planet carrier 458. For example, the one or more seals 492 extend axially between the auxiliary supply line 226 and the planet carrier 458. The auxiliary lubricant 201 flows into the cavity 494 through the auxiliary supply line 226, and the cavity 494 is pressurized with the auxiliary lubricant 201. For example, the auxiliary lubricant 201 flows generally axially from the auxiliary supply line 226 into the cavity 494. The one or more seals 492 prevent the auxiliary lubricant 201 from flowing out of the cavity 494 in a radial direction. The one or more first passages 461 are radially aligned with the respective cavity 494. In this way, the auxiliary lubricant 201 flows from the cavity 494 to the one or more first passages 461 as the planet carrier 458 rotates. Thus, the auxiliary lubricant 201 is supplied from the cavity 494 to the one or more first passages 461.

Figure 5A:
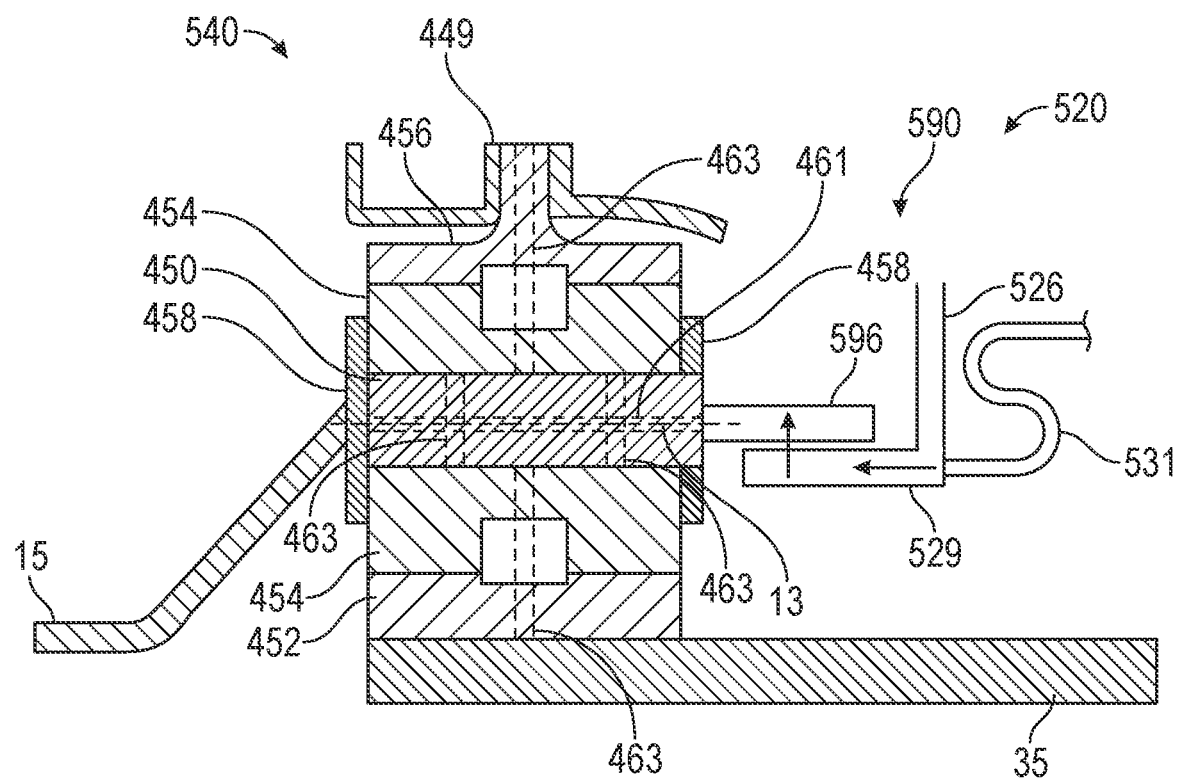
FIG. 5A is a schematic partial cross-sectional side view of another exemplary gearbox assembly and another passive auxiliary lubrication system, according to an aspect of the present disclosure.

FIG. 5A shows a schematic partial cross-sectional side view of another gearbox assembly 540 and another passive auxiliary lubrication system 520 (shown schematically in FIG. 5A). FIG. 5A shows only a portion of the passive auxiliary lubrication system 520. The passive auxiliary lubrication system 520 may include the same or similar components and functionality as the embodiments shown in FIGS. 2 and 3.

The passive auxiliary lubrication system 520 includes a lubricant transfer device 590. The lubricant transfer device 590 facilitates transfer of the auxiliary lubricant 201 from an auxiliary supply line 526 to the gearbox assembly 540, as detailed below. The lubricant transfer device 590 includes a stationary manifold 529 and a transfer manifold 596. The stationary manifold 529 is connected to a static structure of the engine 10 through a flexible component 531. The flexible component 531 may allow the lubricant transfer device 590 to move with the gearbox assembly 540 due to, for example, vibrations associated with the engine 10. The auxiliary supply line 526 is fluidly coupled to the stationary manifold 529. In some examples, the auxiliary supply line 526 may include a plurality of auxiliary supply lines 526 and each of the plurality of auxiliary supply lines 526 may be fluidly coupled to the stationary manifold 529. In some examples, the portion of the auxiliary supply line 526 shown in FIG. 5A may include an annular component.

Figure 5B:
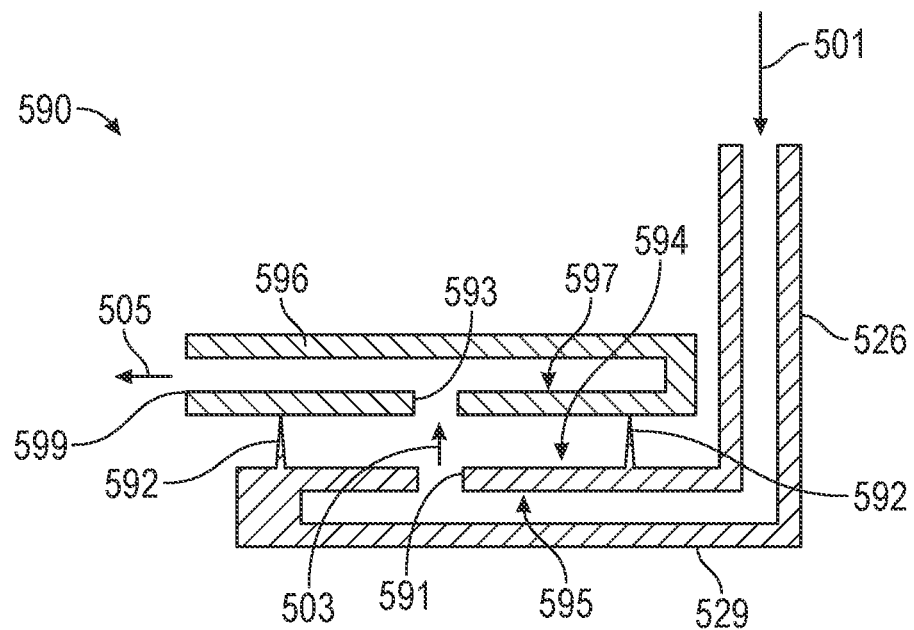
FIG. 5B is an enlarged partial cross-sectional side view of a lubricant transfer device for the passive auxiliary lubrication system of FIG. 5A and isolated from the gearbox assembly, according to an aspect of the present disclosure.

FIG. 5B is an enlarged partial cross-sectional side view of the lubricant transfer device 590 isolated from the gearbox assembly 540 (FIG. 5A). The lubricant transfer device 590 includes one or more seals 592 (e.g., a labyrinth tooth seal) and a cavity 594. The stationary manifold 529 includes an annular component defining an internal passage 595.

The transfer manifold 596 is annular and includes one or more internal passages 597 extending in a generally axial direction therethrough. In some examples, the one or more internal passages 597 include a single annular passage. The transfer manifold 596 includes one or more axial apertures 599. Each of the one or more axial apertures 599 is fluidly coupled to a different pin 450 (e.g., to the one or more first passages 461 of a respective pin 450) (FIG. 5A). In some examples, the one or more internal passages 597 include a plurality of internal passages 597. Each of the plurality of internal passages 597 is fluidly coupled to a different pin 450 (FIG. 5A). The transfer manifold 596 is radially spaced from the stationary manifold 529 to define the cavity 594.

The cavity 594 is annular and is fluidly coupled to the stationary manifold 529 and is fluidly coupled to the transfer manifold 596. The stationary manifold 529 includes one or more apertures, also referred to as stationary manifold apertures 591, and the transfer manifold 596 includes one or more apertures, also referred to as transfer manifold apertures 593. The stationary manifold apertures 591 extend radially through an axial wall of the stationary manifold 529. The transfer manifold apertures 593 extend radially though an axial wall of the transfer manifold 596.

The axial wall of stationary manifold 529 is spaced radially from the axial wall of the transfer manifold 596. The one or more seals 592 define a portion of the cavity 594 and extend from a radially outer portion of the axial wall of the stationary manifold 529 to a radially inner portion of the axial wall of the transfer manifold 596. In this way, the cavity 594 is defined between the stationary manifold 529 and the transfer manifold 596. The stationary manifold apertures 591 are located to provide the auxiliary lubricant 201 to flow from the stationary manifold 529 to the cavity 594. The transfer manifold apertures 593 are located to receive the auxiliary lubricant 201 from the cavity 594 into the one or more internal passages 597.

The transfer manifold 596 is connected to the planet carrier 458 (FIG. 5A) and the one or more internal passages 597 are generally radially and axially aligned with the one or more first passages 461 (FIG. 5A). In this way, the stationary manifold 529 is stationary and the transfer manifold 596 rotates with the planet carrier 458 (FIG. 5A). Thus, the lubricant transfer device 590 facilitates transfer of the auxiliary lubricant 201 from the auxiliary supply line 526 (FIG. 5A) (stationary) to a respective pin 450 (FIG. 5A) (rotating) via the stationary manifold 529 and the transfer manifold 596.

In operation, the auxiliary lubricant 201 is supplied from the auxiliary supply line 526 into the stationary manifold 529 (e.g., into the internal passage 595), as indicated by the arrow 501. The auxiliary lubricant 201 is then supplied from the stationary manifold 529 into the cavity 594, and the cavity 594 is pressurized with the auxiliary lubricant 201. For example, the auxiliary lubricant 201 flows generally radially from the stationary manifold 529 into the cavity 594 via the stationary manifold apertures 591. The one or more seals 592 prevent the auxiliary lubricant 201 from flowing out of the cavity 594 in an axial direction. The respective transfer manifold apertures 593 are aligned with the cavity 594. In this way, the auxiliary lubricant 201 flows from the cavity 594 to the one or more internal passages 597 of the transfer manifold 596 via the respective transfer manifold apertures 593 (as indicated by the arrow 503). The auxiliary lubricant 201 flows through the one or more internal passages 597 and into the one or more first passages 461 (FIG. 5A) (as indicated by the arrow 505). Thus, the auxiliary lubricant 201 is supplied from the cavity 594 to the one or more first passages 461 (FIG. 5A) of each respective pin 450 (FIG. 5A).

The selection between using the lubricant transfer device 490 (FIG. 4) or using the lubricant transfer device 590 (FIGS. 5A and 5B) for transferring the lubricant from a static component (e.g., auxiliary supply line 226, 526) to a rotating component (e.g., the pin 450) may be based on several factors. For example, the factors may include geometric constraints of the engine 10 and an effectiveness of the sealing arrangement (e.g., a labyrinth tooth seal or a face seal) for a particular application (e.g., transferring the lubricant axially or transferring the lubricant radially).

Figure 6:
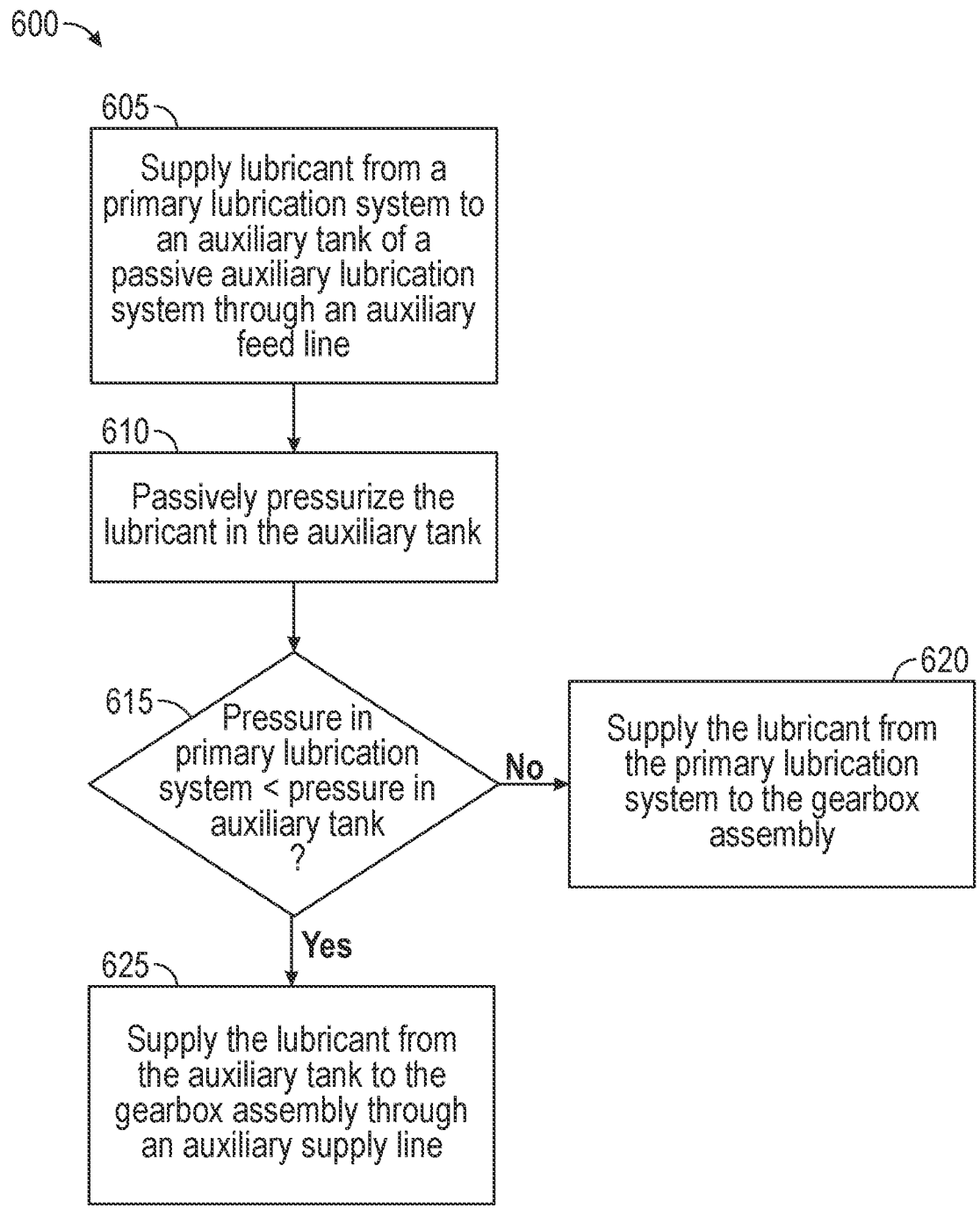
FIG. 6 is a flow diagram of an exemplary method of lubricating a gearbox assembly of the gas turbine engine of FIG. 1, according to an aspect of the present disclosure.

FIG. 6 is a flow diagram of an exemplary method 600 of lubricating the gearbox assembly 40 of the engine 10. While the embodiment of the method 600 makes primary reference to FIG. 1 and the gearbox assembly 40, the method 600 may, of course, be performed with any of the gearbox assemblies or any of the passive auxiliary lubrication systems of FIGS. 2 to 5B, detailed herein. In step 605, the method 600 includes supplying lubricant from the primary lubrication system 202 to the auxiliary tank 222 of the passive auxiliary lubrication system 220 through the auxiliary tank feed line 224. For example, the pump 206 of the primary lubrication system 202 pumps lubricant from the primary tank 204 to the auxiliary tank 222, as detailed above. In step 610, the method 600 includes passively pressurizing the lubricant in the auxiliary tank 222. For example, the auxiliary tank 222 is passively pressurized by the piston 230 and/or is passively pressurized by the compressor bleed air, as detailed above. In this way, the auxiliary tank 222 is charged, as detailed above.

When the auxiliary tank 222 is charged, in step 615, the method 600 includes determining whether a pressure in the primary lubrication system 202 is less than a pressure in the auxiliary tank 222. For example, the first valve 225 closes when the auxiliary tank 222 has been charged and the second valve 227 remains closed. In step 620, when the pressure in the primary lubrication system 202 is greater than or equal to the pressure in the auxiliary tank 222 (step 615: NO), the method 600 includes supplying the lubricant from the primary lubrication system 202 to the gearbox assembly 40. For example, the pump 206 pumps the lubricant from the primary tank 204 and supplies the lubricant from the primary tank 204 to the gearbox assembly 40, as detailed above.

In step 625, when the pressure in the primary lubrication system 202 is less than the pressure in the auxiliary tank 222 (step 615: YES), the method 600 includes supplying the lubricant in the auxiliary tank 222 to the gearbox assembly 40 through the auxiliary supply line 226. For example, the auxiliary supply line 226 includes a valve (e.g., the second valve 227) that opens when the pressure in the auxiliary tank 222 is greater than the pressure in the primary lubrication system 202, as detailed above. Thus, the passive auxiliary lubrication system 220 supplies the lubricant from the auxiliary tank 222 to the gearbox assembly 40 when the pressure in the primary lubrication system 202 decreases below a predetermined threshold (e.g., during an abnormal event).

Embodiments of the present disclosure detailed herein provide for a passive auxiliary lubrication system that ensures a supply of lubricant to a gearbox assembly during abnormal events when the primary lubrication system is unavailable. The passive auxiliary lubrication system provides the lubrication to the gearbox assembly without the use of a pump or additional control systems. The present disclosure also provides for a transfer device that enables the passive auxiliary lubrication system to transfer the lubrication from a non-rotating component (e.g., the auxiliary supply line) to a rotating component of the gearbox assembly (e.g., the rotating planet gears). Thus, the embodiments of the present disclosure provide for an auxiliary lubrication system that ensures lubricant is supplied to the gearbox assembly when the primary lubrication system is unable to supply lubrication to the gearbox assembly, without the use of additional pumps or control systems.

Further aspects of the present disclosure are provided by the subject matter of the following clauses.

A passive auxiliary lubrication system for supplying lubricant to a gearbox assembly of an engine comprises an auxiliary tank for storing lubricant and an auxiliary tank feed line. The auxiliary tank for storing lubricant is passively pressurized. The auxiliary tank feed line is fluidly coupled with the auxiliary tank and a primary lubrication system. The lubricant is supplied to the auxiliary tank from the primary lubrication system through the auxiliary tank feed line and the lubricant is passively pressurized in the auxiliary tank. An auxiliary supply line is fluidly coupled with the auxiliary tank and the gearbox assembly. The lubricant in the auxiliary tank is supplied to the gearbox assembly through the auxiliary supply line.

The passive auxiliary lubrication system of the preceding clause, further including a compressor bleed air line that fluid couples the auxiliary tank to a compressor section of the engine such that the auxiliary tank receives bleed air from the compressor section to passively pressurize the auxiliary tank.

The passive auxiliary lubrication system of any preceding clause, the auxiliary tank including a piston for passively pressurizing the lubricant in the auxiliary tank.

The passive auxiliary lubrication system of any preceding clause, the piston being spring-loaded.

The passive auxiliary lubrication system of any preceding clause, the auxiliary tank feed line including a first valve. The first valve operable to supply the lubricant from the primary lubrication system to the auxiliary tank when a pressure in the primary lubrication system is greater than a pressure in the auxiliary tank.

The passive auxiliary lubrication system of any preceding clause, the auxiliary supply line further including a second valve. The second valve operable to supply the lubricant from the auxiliary tank to the gearbox assembly when the pressure in the auxiliary tank is greater than the pressure in the primary lubrication system.

The passive auxiliary lubrication system of any preceding clause, further comprising a lubricant transfer device. The lubricant transfer device includes a cavity fluidly coupled to the auxiliary supply line and fluidly coupled to a plurality of planet gears on a rotating planet carrier. The plurality of the planet gears has one or more passages and the cavity receiving the lubricant from the auxiliary supply line and supplying the lubricant to the one or more passages of the plurality of planet gears as the rotating planet carrier rotates.

The passive auxiliary lubrication system of any preceding clause, the cavity being defined by one or more seals extending axially between the auxiliary supply line and the rotating planet carrier.

The passive auxiliary lubrication system of any preceding clause, the cavity being axially and radially aligned with the one or more passages of the plurality of planet gears such that the lubricant is supplied axially from the cavity to the one or more passages of the plurality of planet gears.

The passive auxiliary lubrication system of any preceding clause, the lubricant transfer device including a transfer manifold having one or more internal passages, the one or more internal passages of the transfer manifold being fluidly coupled to the cavity and fluidly coupled to the one or more passages of the plurality of planet gears.

The passive auxiliary lubrication system of any preceding clause, the cavity being defined by one or more seals extending radially between a stationary manifold and the transfer manifold.

The passive auxiliary lubrication system of any preceding clause, the stationary manifold including one or more stationary manifold apertures and the transfer manifold including one or more transfer manifold apertures such that the lubricant is supplied radially from stationary manifold into the cavity through the one or more stationary manifold apertures, and the lubricant is supplied from the cavity to the one or more internal passages of the transfer manifold through the one or more transfer manifold apertures to supply the lubricant to the one or more passages of the plurality of planet gears.

A method of lubricating a gearbox assembly of an engine, the method comprising supplying a lubricant from a primary lubrication system to an auxiliary tank of a passive auxiliary lubrication system through an auxiliary feed line, passively pressurizing the lubricant in the auxiliary tank, and supplying the lubricant from the auxiliary tank to the gearbox assembly through an auxiliary supply line when a pressure in the primary lubrication system is less than a pressure in the auxiliary tank.

The method of any preceding clause, the supplying the lubricant from the auxiliary tank to the gearbox assembly including supplying the lubricant from the auxiliary tank to the gearbox assembly without a pump.

The method of any preceding clause, the passively pressurizing the lubricant in the auxiliary tank including supplying bleed air from a compressor section of the engine to the auxiliary tank.

The method of any preceding clause, the auxiliary tank including a piston, and the passively pressurizing the lubricant in the auxiliary tank including pressurizing the lubricant in the auxiliary tank with the piston.

The method of any preceding clause, the piston being spring-loaded.

The method of any preceding clause, the gearbox assembly including a rotating planet carrier containing a plurality of planet gears housing one or more passages. The supplying the lubricant from the auxiliary tank to the gearbox assembly further includes supplying the lubricant from the auxiliary supply line to a cavity of a lubricant transfer device, and supplying the lubricant from the cavity to the one or more passages of the plurality of planet gears as the rotating planet carrier rotates.

The method of any preceding clause, the supplying the lubricant from the cavity to the one or more passages including supplying the lubricant axially from the cavity to the one or more passages.

The method of any preceding clause, the supplying the lubricant from the cavity to the one or more passages including supplying the lubricant radially to a transfer manifold of the lubricant transfer device.

Although the foregoing description is directed to the preferred embodiments, other variations and modifications will be apparent to those skilled in the art and may be made without departing from the spirit or the scope of the disclosure. Moreover, features described in connection with one embodiment may be used in conjunction with other embodiments, even if not explicitly stated above.

The invention claimed is:

1. A passive auxiliary lubrication system comprising:
a gearbox assembly of an engine, the gearbox assembly comprising a sun gear, a plurality of planet gears, and a ring gear;
a pin disposed in a planet gear of the plurality of planet gears, the pin having an axially extending passage;
a plurality of radially extending passages disposed radially through the pin and through the sun gear, the plurality of planet gears, and the ring gear, the plurality of radially extending passages in fluid communication with the axially extending passage of the pin;
an auxiliary tank for storing lubricant, the auxiliary tank being passively pressurized to passively pressurize the lubricant;
an auxiliary tank feed line fluidly coupled with the auxiliary tank and a primary lubrication system, wherein the lubricant is supplied to the auxiliary tank from the primary lubrication system through the auxiliary tank feed line; and
an auxiliary supply line fluidly coupled with the auxiliary tank and the pin, the auxiliary supply line being coaxial with the axially extending passage of the pin and providing a flow of lubricant through the axially extending passage of the pin,
wherein the plurality of planet gears are entirely downstream of the auxiliary supply line with respect to the flow of lubricant through the axially extending passage of the pin, and
wherein the lubricant in the auxiliary tank flows from the axially extending passage radially through the plurality of radially extending passages to the sun gear, the plurality of planet gears, and the ring gear to lubricate the sun gear, the plurality of planet gears, and the ring gear.

2. The passive auxiliary lubrication system of claim 1, further comprising a compressor bleed air line that fluidly couples the auxiliary tank to a compressor section of the engine such that the auxiliary tank receives bleed air from the compressor section to passively pressurize the auxiliary tank.

3. The passive auxiliary lubrication system of claim 1, wherein the auxiliary tank includes a piston for passively pressurizing the lubricant in the auxiliary tank.

4. The passive auxiliary lubrication system of claim 3, wherein the piston is spring-loaded.

5. The passive auxiliary lubrication system of claim 1, wherein the auxiliary tank feed line includes a first valve, the first valve operable to supply the lubricant from the primary lubrication system to the auxiliary tank when a pressure in the primary lubrication system is greater than a pressure in the auxiliary tank.

6. The passive auxiliary lubrication system of claim 5, wherein the auxiliary supply line further includes a second valve, the second valve operable to supply the lubricant from the auxiliary tank to the gearbox assembly when the pressure in the auxiliary tank is greater than the pressure in the primary lubrication system.

7. The passive auxiliary lubrication system of claim 2, wherein the compressor bleed air line includes a third valve and a pressure regulator, the pressure regulator controlling the third valve to open or to close to regulate an amount of the bleed air into the auxiliary tank.

8. The passive auxiliary lubrication system of claim 3, wherein the auxiliary tank includes a mechanical stop that prevents the piston from moving beyond the mechanical stop.

9. The passive auxiliary lubrication system of claim 1, further comprising a pump in the primary lubrication system, the pump pressurizing the lubricant to supply the lubricant to the auxiliary tank.

10. The passive auxiliary lubrication system of claim 5, wherein the first valve is a check valve.

11. The passive auxiliary lubrication system of claim 6, wherein the second valve is a check valve.

12. The passive auxiliary lubrication system of claim 1, wherein the gearbox assembly of the engine is a gearbox assembly of a gas turbine engine.

13. The passive auxiliary lubrication system of claim 12, wherein the gearbox assembly drivingly couples an engine core to a fan of the gas turbine engine.

* * * * *